US009514430B2

(12) United States Patent
Miette et al.

(10) Patent No.: US 9,514,430 B2
(45) Date of Patent: Dec. 6, 2016

(54) METHOD OF HANDLING PARCELS, AND A LOGISTICS CENTER FOR HANDLING PARCELS

(71) Applicant: SOLYSTIC, Bagneux (FR)

(72) Inventors: Emmanuel Miette, Saint Gratien (FR); Luc Chirol, Paris (FR)

(73) Assignee: SOLYSTIC, Bagneux (FR)

( * ) Notice: Subject to any disclaimer, the term of this patent is extended or adjusted under 35 U.S.C. 154(b) by 123 days.

(21) Appl. No.: 14/130,186

(22) PCT Filed: Aug. 7, 2013

(86) PCT No.: PCT/FR2013/051904

§ 371 (c)(1),
(2) Date: Dec. 30, 2013

(87) PCT Pub. No.: WO2014/057182

PCT Pub. Date: Apr. 17, 2014

(65) Prior Publication Data

US 2015/0235165 A1 Aug. 20, 2015

(30) Foreign Application Priority Data

Oct. 11, 2012 (FR) ..................................... 12 59699

(51) Int. Cl.

| | |
|---|---|
| ***G06Q 10/08*** | (2012.01) |
| *B07C 5/36* | (2006.01) |
| *B65G 47/00* | (2006.01) |

(52) U.S. Cl.

CPC ............... *G06Q 10/083* (2013.01); *B07C 5/36* (2013.01); *B65G 47/00* (2013.01)

(58) Field of Classification Search

CPC ........ G06Q 10/08; B07C 5/36; B65G 1/048; B65G 47/00–47/96

USPC .................................................. 705/335–338

See application file for complete search history.

(56) References Cited

U.S. PATENT DOCUMENTS

| | | | | |
|---|---|---|---|---|
| 3,167,192 | A * | 1/1965 | Harrison | B07C 3/082 198/349 |
| 4,232,370 | A * | 11/1980 | Tapley | G06Q 10/08 414/273 |
| 5,462,400 | A * | 10/1995 | Bonnet | B65G 59/023 198/785 |
| 5,903,464 | A * | 5/1999 | Stingel, Jr. | B65G 47/5109 198/347.1 |
| 5,953,234 | A * | 9/1999 | Singer | B65G 1/0485 414/789.6 |
| 5,990,437 | A * | 11/1999 | Coutant | B65G 47/965 198/349.95 |
| 6,447,236 | B1 * | 9/2002 | Grams | B25J 15/10 209/900 |
| 6,579,053 | B1 * | 6/2003 | Grams | B25J 15/10 198/348 |

(Continued)

*Primary Examiner* — Narayanswamy Subramanian

(74) *Attorney, Agent, or Firm* — Vidas, Arrett & Steinkraus, P.A.

(57) ABSTRACT

A method of handling parcels (2) and a logistics center (1) for handling parcels, use is made of superposable racks (5) and motor-driven shuttle carts (6) that are remotely controlled by a central processing unit (7) to travel in freely guided manner and that are suitable for docking with each rack (5), each parcel (2) is unloaded onto a rack (5) and the destination of the parcel is identified (103), a specific location is assigned (104) to said rack (5) using an outward shipping plan, and said corresponding shuttle cart (6) is caused to move (105) so as to store said parcels (2) side-by-side and in superposed manner, and then, using an inward delivery plan, each rack (5) is docked (110), and each parcel (2) is transferred (111) from said stowage zone (11) to a loading point (3) so that parcels (2) are presented in their order of delivery.

8 Claims, 5 Drawing Sheets

(56) References Cited

U.S. PATENT DOCUMENTS 6,612,568 B1 * 9/2003 Gaissmaier ............ B65H 31/10 271/213
6,866,471 B2 * 3/2005 Grams ..................... B25J 15/10 414/807
7,154,060 B2 * 12/2006 Rosenbaum .............. B07C 3/00 209/584
7,325,497 B2 * 2/2008 Ben-Ezra .................. B07C 5/36 104/88.01
7,448,499 B2 * 11/2008 Roth ......................... B07C 3/00 209/540
8,893,877 B2 * 11/2014 Tan ......................... B64F 1/366 198/340
8,965,563 B2 * 2/2015 Eldershaw ............. B65G 47/00 700/218
2003/0123970 A1 * 7/2003 Grams ..................... B25J 15/10 414/807
2005/0192701 A1 * 9/2005 Ben-Ezra .................. B07C 5/36 700/213
2007/0073578 A1 * 3/2007 Roth ...................... G06Q 10/08 705/13
2010/0300048 A1 * 12/2010 Krizmanic ........... B65G 1/1378 53/452
2012/0253507 A1 * 10/2012 Eldershaw ............. B65G 47/00 700/218

* cited by examiner

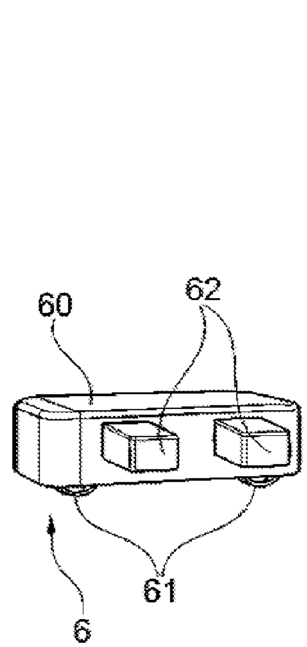
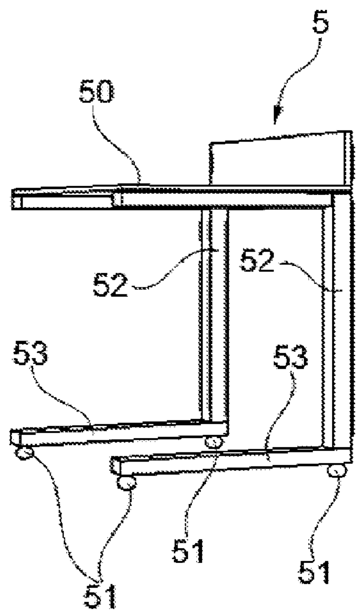
Fig. 5
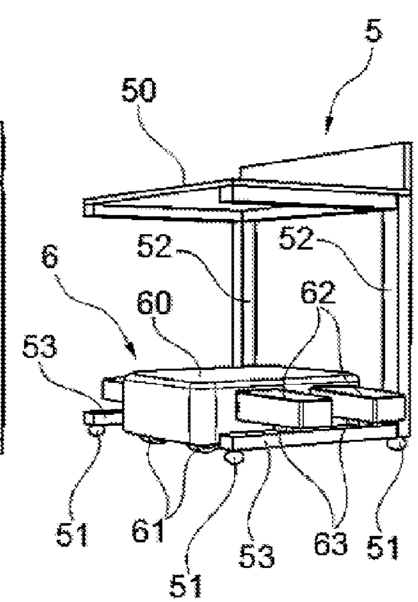
Fig. 6
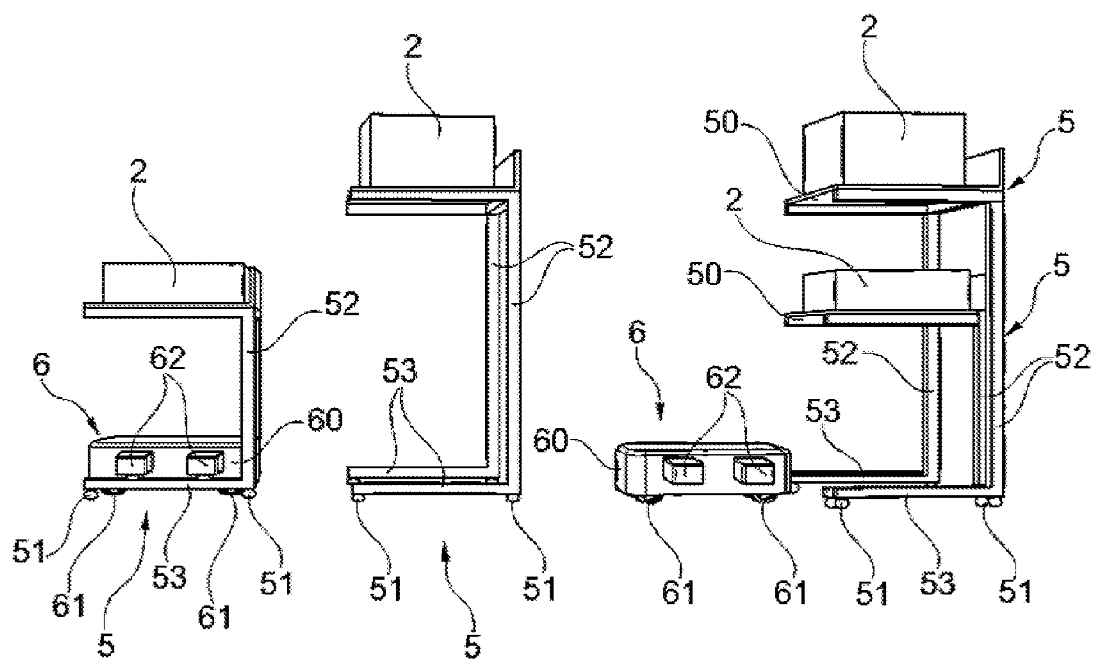
Fig. 7
Fig. 8

METHOD OF HANDLING PARCELS, AND A LOGISTICS CENTER FOR HANDLING PARCELS

CROSS-REFERENCE TO RELATED APPLICATIONS

This application is a national stage application of PCT/FR2013/051904, filed on Aug. 7, 2013 and claiming priority to FR 12 59699 filed on Oct. 11, 2012.

TECHNICAL FIELD

The invention relates to handling parcels, and in particular to handling postal parcels, namely to receiving them in a handling logistics center, and to sorting and organizing them with a view to shipping them in a delivery sequence.

The invention relates more particularly to a method of handling parcels in a logistics center for handling parcels, the method comprising the steps consisting in unloading the parcels at an unloading point of the center, in moving the parcels and in stowing them in organized manner in various segments of a stowage zone of the center, each segment corresponding to a shipment of the parcels, and then in transferring the parcels waiting for loading from each segment to a loading point.

The invention also relates to a logistics center for handling parcels, the logistics center comprising at least one unloading/loading point for unloading/loading the parcels and a stowage zone that is designed to receive parcels waiting for loading and that is subdivided into various segments, each of which corresponds to a shipment of the parcels.

PRIOR ART

Nowadays, in order to ship postal parcels via an outward exchange center, conveyors of the belt-and-rollers type are used that form closed circuits. More particularly, postal parcels coming from collection points dependent on the center in question or from other centers are unloaded onto a conveyor of that type so as to be moved in series along a sort of rectilinear stand in front of which handling employees are positioned, each employee being assigned, for example, to one shipment, e.g. a delivery round or "postman's walk" during which the postal parcels are delivered in the pre-established order of an inward delivery plan. Each handling employee thus takes postal parcels one-by-one in order to make up the shipment to which that employee is assigned. The postal parcels are taken as they go past the stand. The handling employee stows the postal parcels on a segment of the stowage zone that generally extends transversely relative to the stand. Then, each handling employee transports the postal parcels from their segment to their loading point so as to load them onto transport means making it possible to deliver the parcels, e.g. onto a truck.

Such a handling method requires the handling employees to have in-depth knowledge of the shipments and in particular of the various delivery sequences. Any error in the organization of the postal parcels can give rise to additional handling operations, which might cause damage to those postal parcels. That handling method does not make it possible to optimize the use of the stowage zone. In addition, that handling method prevents the shipments being reconfigured dynamically as a function, for example, of the volumes to be delivered. Finally, it requires the handling employees to be present while the parcels are being unloaded onto the conveyor.

SUMMARY OF THE INVENTION

An object of the invention is to remedy those drawbacks by proposing a method of handling parcels, and a logistics center for handling parcels, which method and which center make it possible to limit the handling operations to be performed on the parcels by optimizing the way they are stowed in the center and the way loading them is organized as a function of their delivery sequence.

To this end, the invention provides a method of handling parcels in a logistics center for handling parcels, the method comprising the steps consisting in unloading the parcels at an unloading point of the center, in moving the parcels and in stowing them in organized manner in various segments of a stowage zone of the center, each segment corresponding to a shipment of the parcels, and then in transferring the parcels waiting for loading from each segment to a loading point, said method being characterized in that, in order to move and in order to stow the parcels, it further consists in using racks of the nesting type on legs and of different formats (heights and widths), suitable for nesting together by being superposed on one another, and in using independent self-propelled motor-driven shuttle carts suitable for docking with each rack, which shuttle carts are controlled individually and remotely to travel in freely guided manner, and in that it further comprises the steps consisting in:

- unloading each parcel onto a rack of known format that is docked with and that is motor-driven by a shuttle cart;
- identifying the destination of each parcel;
- using an outward shipping plan associating each destination of a parcel with a shipment so as to allocate a specific location of a segment to the rack carrying the parcel, taking account of the format of the rack so as to enable the parcels to be superposed, and causing the shuttle cart to move towards the specific location so as to store the parcels side-by-side and in superposed manner; and
- using an inward delivery plan specifying the delivery sequence for the parcels within the same shipment so as to cause a shuttle cart to dock with each rack carrying a parcel and so as to cause the parcel to be transferred from the stowage zone to the loading point.

The term "handling" is used generally to mean receiving and sorting the parcels and stowing them in sequenced manner with a view to them being subsequently delivered or onwardly distributed. The basic idea of the invention is thus to use nesting-type racks making it possible to stow the parcels in superposed manner so as to optimize the space occupied by the parcels in the center and the way loading of them is organized with a view to them being delivered in a pre-established sequence. The invention relates particularly to handling postal parcels but it is also applicable to handling other types of article requiring sorting and stowage logistics before delivery or onward distribution. Such other articles may, for example, be baggage to be handled at an airport, when such baggage is to be unloaded and then distributed to various different aircraft. In the meaning of the invention, the term "parcel" is therefore not limited to postal parcels.

The handling method of the invention may advantageously have the following features:

- racks are used that each have a tray adapted to carry a single parcel, and a frame adapted to allow a shuttle cart to fit under the tray with it being possible for the shuttle cart to dock with the frame on command, the frame being adapted to allow a rack of different height and width to fit under or over the tray and to enable the parcels to be superposed; the stowage in the stowage zone can thus be optimized while also making it possible to locate each parcel individually with a view to loading it;

racks are used that each have a unique identifier, an associative table is established between each unique identifier of a rack and the destination of the parcel that it is carrying so as to enable each parcel to be located in said center on the basis of said unique identifiers of the racks, and an allocation table is established between each unique identifier of a rack and said specific location that is allocated;

before moving the shuttle cart to the stowage zone, the shuttle cart loaded with a parcel is caused to move from the unloading point to a service zone of the center, in which zone at least one operation is performed that is chosen from the group comprising at least affixing a label to the parcel, weighing the parcel, inspecting the parcel, repairing the parcel, performing a security inspection on the parcel;

as many racks are used as there are parcels to be sorted; and a digital image is taken of each parcel and, on the basis of the digital image, the destination of the parcel is recognized.

The invention also provides a logistics center for handling parcels, said logistics center comprising at least one unloading/loading point for unloading/loading the parcels and a stowage zone that is designed to receive parcels waiting for loading and that is subdivided into various segments, each of which corresponds to a shipment of the parcels, said logistics center being characterized in that it includes racks of the nesting type on legs and of different formats (heights and widths), suitable for nesting together by being superposed on one another, and independent self-propelled motor-driven shuttle carts suitable for docking with each rack, identification means for identifying the destination of each parcel, a monitoring and control central processing unit that is suitable for individually and remotely controlling the shuttle carts so that they travel in freely guided manner, and that has an outward shipping plan for shipment of the parcels, which plan associates each destination of a parcel with a shipment, and an inward delivery plan specifying the delivery sequence for delivery of the parcels within the same shipment, and in that the parcels are stored side-by-side and in superposed manner in each segment.

In an advantageous embodiment of the logistics center of the invention for handling parcels, each rack has a tray adapted to carry a single parcel, and a frame adapted to allow a shuttle cart to fit under the tray with it being possible for the shuttle cart to dock with the frame on command from the central processing unit, the frame being adapted to allow a rack of different height and width to fit under or over the tray and to enable the parcels to be superposed.

BRIEF DESCRIPTION OF THE DRAWINGS

The present invention can be better understood and other advantages appear on reading the following detailed description of an implementation given by way of non-limiting example and with reference to the accompanying drawings, in which:

FIGS. 5 and 6 are perspective views showing an empty rack being docked by a shuttle cart;

FIGS. 7 and 8 are perspective views showing the superposed stowage of two racks carrying the parcels;

DESCRIPTION OF AN IMPLEMENTATION

In general manner, the invention thus relates to a method of handling parcels and to a logistics center for handling parcels, the center making it possible to implement the method. As described in detail below, the parcels may be postal parcels and the center may be a postal center. The parcels may also, for example, be baggage, and the center may be a place designed for organizing loading of the baggage into transport means such as, for example, an aircraft, so that, on disembarkment, baggage recovery can take place in a predetermined sequence. The parcels may also be the result of preparing outward orders from a logistics depot, and the center may be a place designed for shipping the orders.

The following description is focused non-limitingly on postal parcels and on a logistics center for handling postal parcels.

Figure 1:
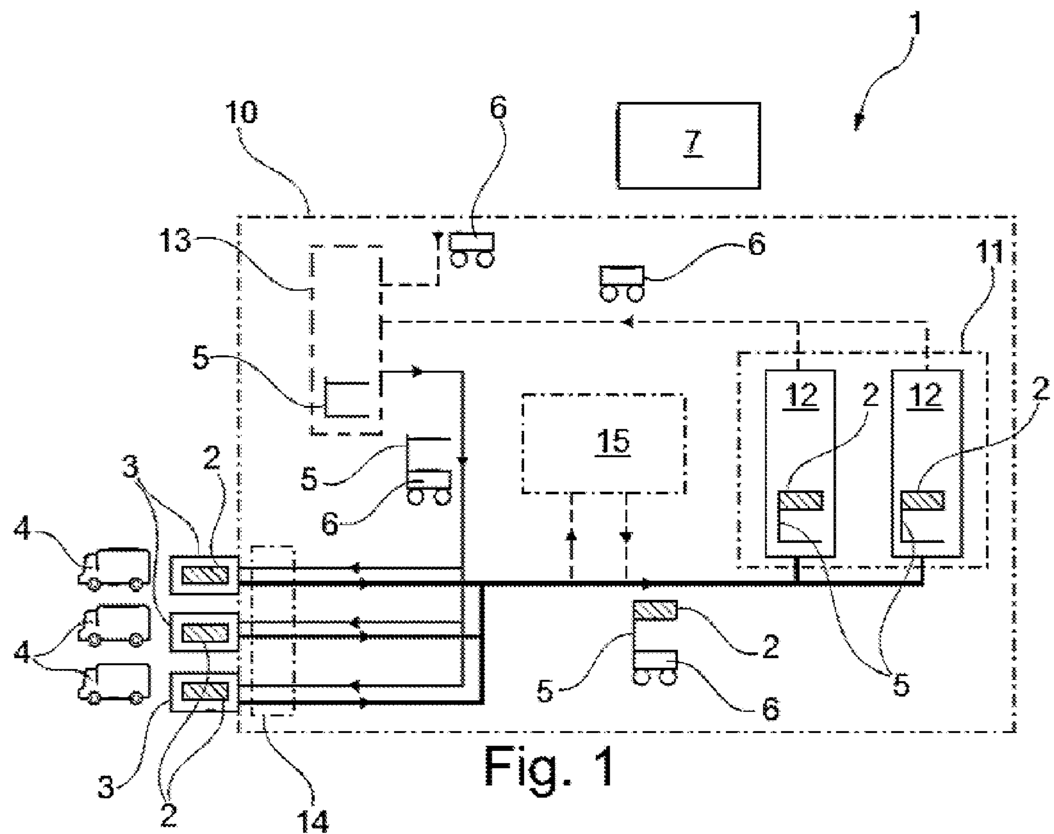
FIGS. 1 and 2 are diagrams of the logistics center of the invention for handling parcels, the diagrams showing the movements of the shuttle carts, of the nesting racks, and of the parcels during the steps of the handling method of the invention, respectively the steps of unloading the parcels and of moving them to the stowage zone, and the steps of transferring the parcels with a view to loading them, the arrows showing the directions of the movements.
Figure 2:
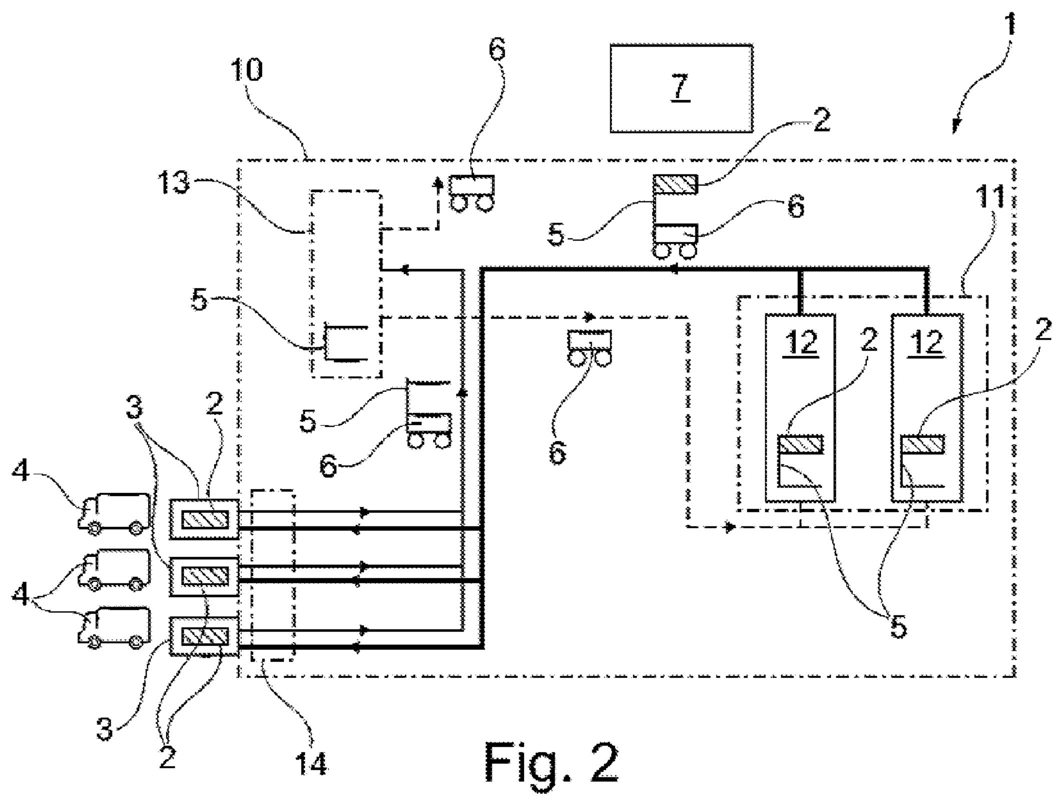
Figure 3:
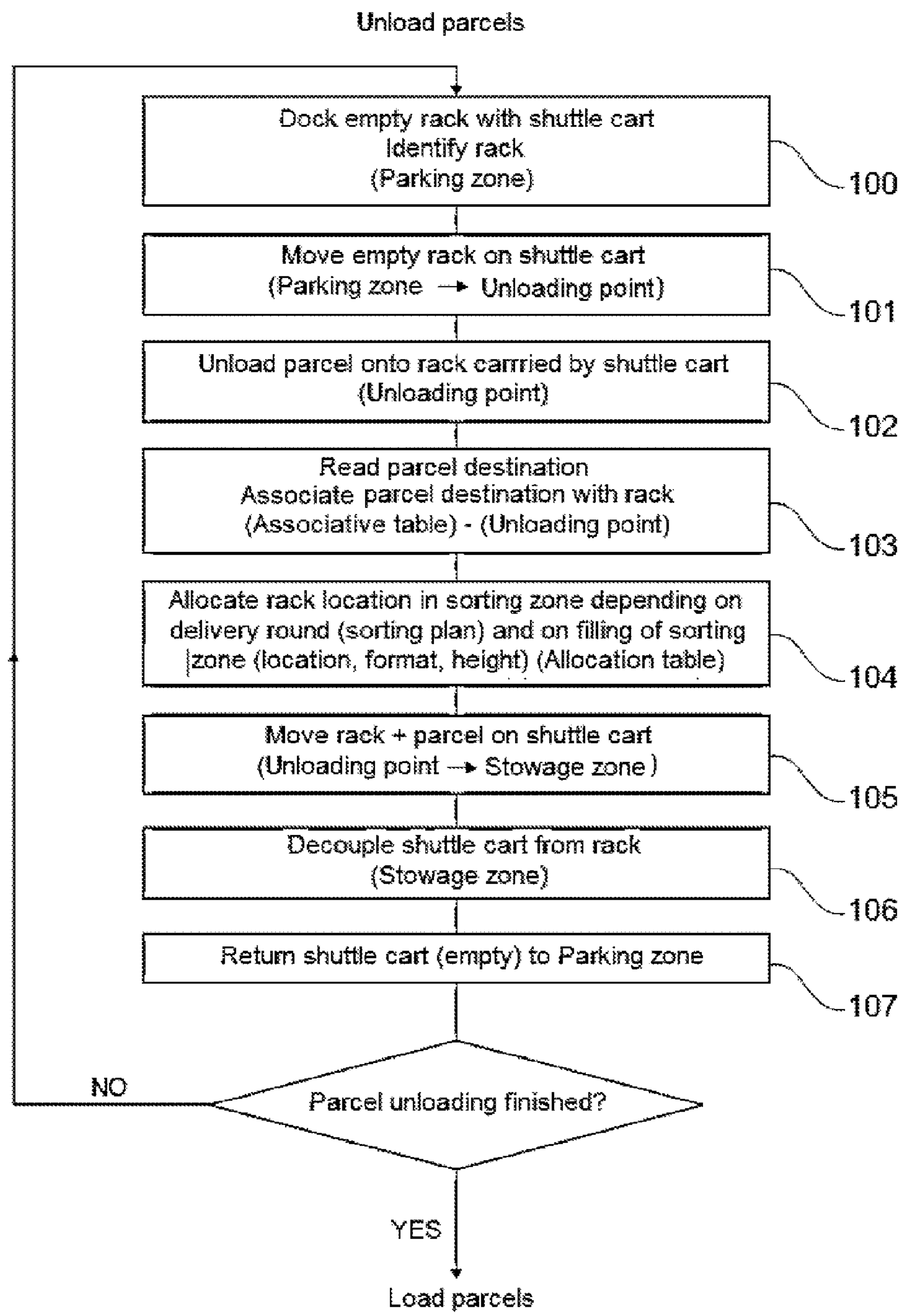
FIGS. 3 and 4 are flow charts showing in detail the steps of the handling methods respectively of FIG. 1 and of FIG. 2.
Figure 4:
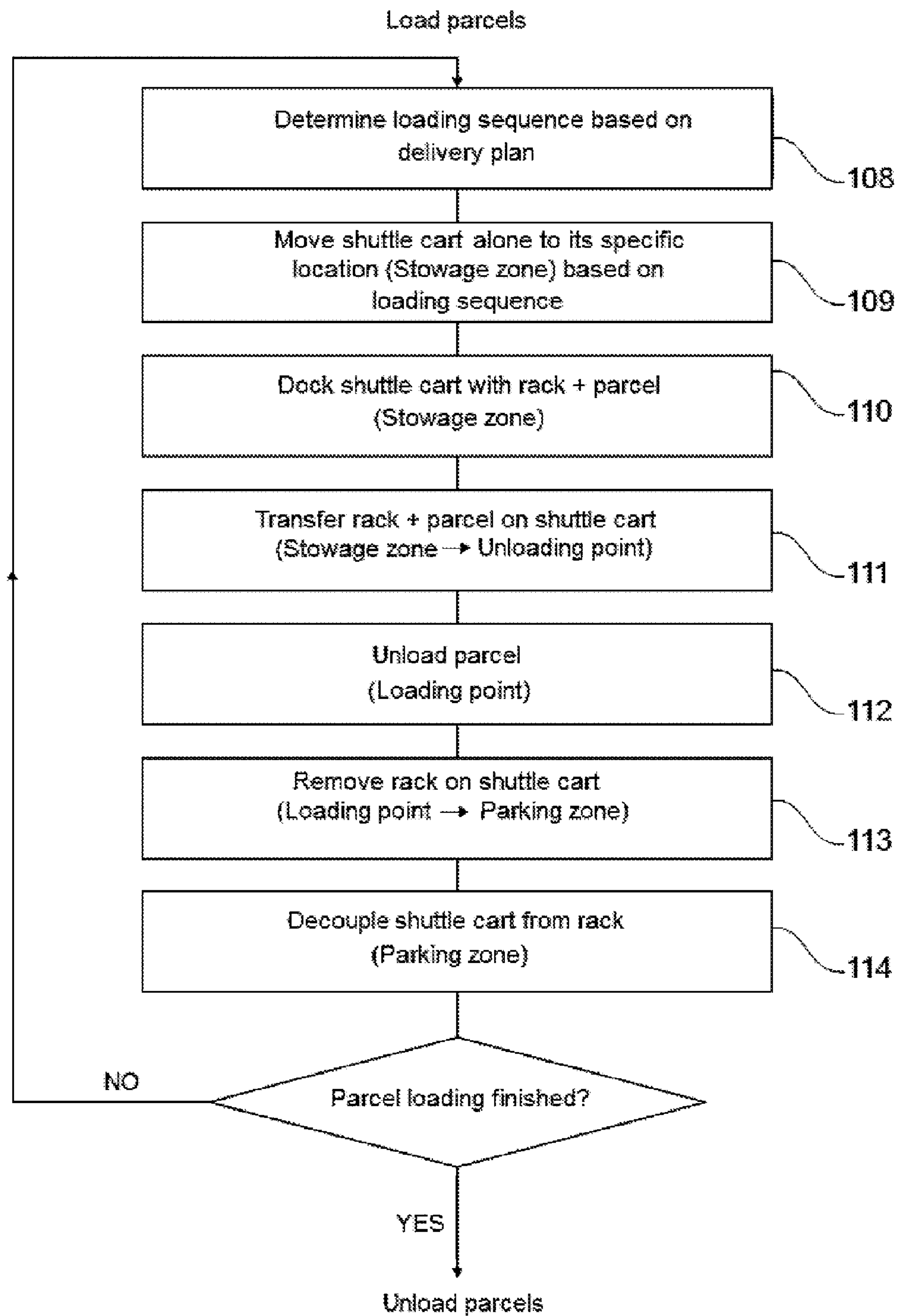

In known manner, the logistics center 1 for handling parcels 2 shown in FIGS. 1 and 2 has a platform 10 provided with unloading and loading points 3 for unloading and loading the parcels 2, which points are accessible to transport means, such as, for example, trucks 4 for bringing the parcels 2 and for taking them away. In the example shown, there are three unloading points 3 disposed side-by-side, each combined with a loading point 3. Naturally, the unloading points 3 may be dissociated from the loading points 3, and/or there may be a larger number of them, and/or they may be disposed in a configuration other than the configuration shown.

Figure 9:
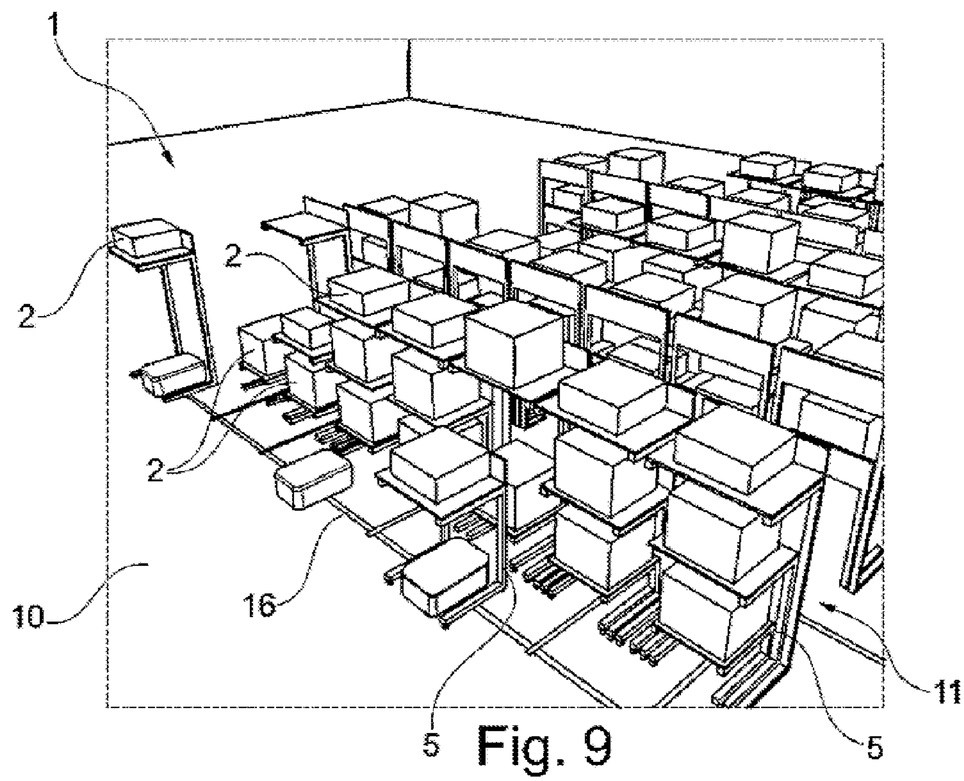
FIGS. 9 and 10 are respectively a view in perspective and a view from above of the stowage zone, organized into segments, of a logistics center of the invention for handling parcels, showing how the racks carrying parcels disposed side-by-side and superposed are stowed.
Figure 10:
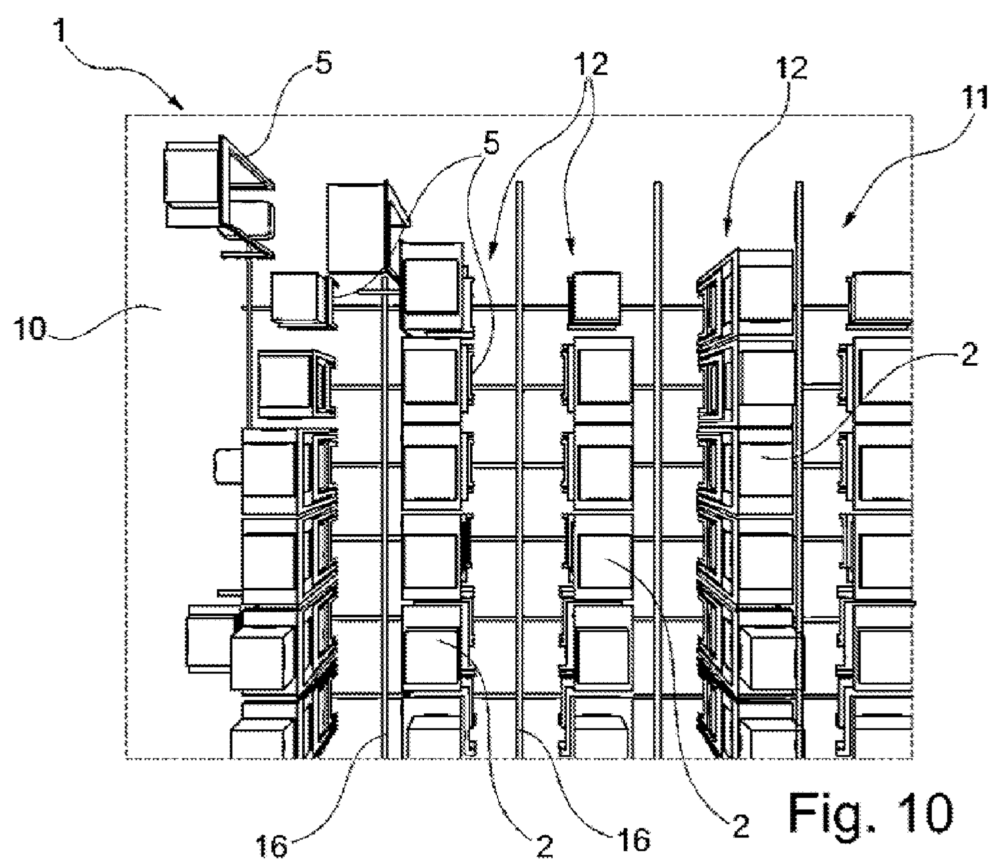

In particular, the platform 10 includes a stowage zone 11 designed to receive the parcels 2 that are unloaded and that are waiting to be loaded. This stowage zone 11 is subdivided into a plurality of segments 12, and into two segments 12 in the example shown in FIGS. 1 and 2. FIGS. 9 and 10 show a stowage zone 11 having a larger number of segments 12, with only some of the references relating to the parcels 2, to the racks 5, and to the segments 12 being given.

The center 1 of the invention includes a parking zone 13 in which the racks 5 are stored. The racks 5, shown in detail in FIGS. 5 to 8, are on legs and of the nesting type. Each rack 5 has a tray 50 adapted in size to carry a single parcel 2. The tray 50 is secured to a frame carried by wheels 51. The frame has two vertical members 52 that are secured at their bottom ends to two horizontal members 53 that are mutually parallel and that are provided with wheels 51. The racks 5 are of mutually different heights and widths. In the example shown, the racks 5 thus have three different formats (height-width pairs): small format, medium format, and large format. In addition, under the tray 50, the frame does not have any cross-member interconnecting the vertical members 52 or the horizontal members 53. Thus, and as shown in FIGS. 7 and 8, a rack 5 of small format or of medium format can fit under a rack 5 of medium format or of large format, under which it can be stowed. It is thus possible to stow racks 5 of different formats at the same place. In the example, shown, three racks 5, each having a respective one of the three formats that is different from the other two, can be stowed at the same location, nested and superposed relative to one another. In addition, the shuttle carts described below are designed to be suitable for fitting under all of the racks 5, regardless of the format of each rack 5. Naturally, it is possible to use a larger number of formats for the racks 5. When they are not being stored in the parking zone 13, the racks 5 can be waiting in the stowage zone 11 or be traveling around the platform 10. In the example shown, the racks 5 are intrinsically movable by means of their wheels 51. In a variant implementation (not shown), the racks are not provided with wheels, and they are moved by being carried by a motor-driven shuttle cart that is described below.

The center 1 of the invention also includes shuttle carts 6, e.g. stored in the parking zone 13 with the racks 5 or in any other parking zone or maintenance zone. When they are not being stored, the shuttle carts 6 are traveling around the platform 10. The width of the shuttle cart 6 is less than the distance between the horizontal members 53 of the rack 5 of small format. Thus, and as shown in FIGS. 6 and 7, the shuttle cart 6 can fit between the horizontal members 53 of each rack 5, regardless of whether or not the rack is carrying a parcel 2 and regardless of its format. As shown in detail in FIGS. 5 to 8, each shuttle cart 6 has a motor unit 60 carried by driven wheels 61 controlled by a monitoring and control central processing unit 7 that is described below. The motor unit 60 also has arms 62 that are extensible laterally from the motor unit 60 and that are caused to be deployed by the monitoring and control central processing unit 7. Said arms 62 are provided with grasping means 63 (visible to some extent in FIG. 6) that are suitable for fastening onto the horizontal members 53 of the racks 5. These grasping means 63 are, for example, magnetic means that co-operate with metal horizontal members 53 of the racks 5. In addition, the arms 62 can be deployed above the horizontal members 53 and over a length sufficient to reach the horizontal members 53 of the rack 5 of large format. Thus, the arms 62 can accommodate the various widths of the racks 5 and can dock with a single rack 5 or with a plurality of racks 5 of different formats simultaneously. When the racks 5 are not provided with any wheels, they are rendered movable by the driven wheels 61 of the shuttle carts 6. Each rack 5 coupled with a shuttle cart 6 is thus motor-driven and can be moved alone or with other racks 5, and empty or loaded with its parcel 2. Each shuttle cart 6 is independently self-propelled and is provided with positioning sensors, a power supply, and a computer enabling it, in particular, to optimize its movements and to avoid collisions with obstacles and with other shuttle carts 6. The shuttle carts 6 are individually controlled remotely by the monitoring and control central processing unit 7 shown diagrammatically in FIGS. 1 and 2, and operation of which is described below.

The center 1 of the invention further includes an identification zone 14 (visible in FIG. 1) at which the unloaded parcels 2 are identified. The format of the rack 5 carrying the parcel 2 may also be detected at this identification zone 14, or determined earlier by any suitable means. In addition, the racks 5 may also be identified uniquely. The identity of each rack 5, in addition to its format, may then be detected at said identification zone 14.

The center 1 of the invention includes a monitoring and control central processing unit 7 suitable for supervising operation of the center 1 and in particular for remotely controlling the movements of the shuttle carts 6. The central unit 7 is suitable for receiving information relating to identifying the racks 5 used, to the destinations of the parcels 2, and to the positioning of each shuttle cart 6. Having the movements of the shuttle carts 6 managed by the central processing unit 7 makes it possible to optimize their traffic and to avoid any collision. The central processing unit 7 has an outward shipping plan, an example of which is given below, distributing the destinations of the different parcels 2 into different pre-established shipments. For example, a shipment may correspond to a city neighborhood within which the parcels are to be delivered.

| OUTWARD SHIPPING PLAN | |
|---|---|
| Shipment i | Destination i |
| | . . . |
| | Destination n |
| . . . | . . . |
| Shipment n | Destination i' |
| | . . . |
| | Destination n' |

Thus, as a function of the information collected in the identification zone 14 about the destinations of the unloaded parcels 2, the central processing unit 7 organizes, as described in detail below, the stowage of the racks 5 per shipment in the segments 12 of the stowage zone 11.

The central processing unit 7 also has an inward delivery plan, an example of which is given below, organizing the sequence of delivery of each destination of the same shipment so that the parcels 2 are delivered in optimum manner relative to the route of the truck 4 and to the way in which it is loaded.

| INWARD DELIVERY PLAN | |
|---|---|
| Destination i | Order i |
| . . . | . . . |
| Destination n | Order n |

Thus, once all of the parcels 2 have been stowed, the central processing unit 7 organizes recovery of them by following this inward delivery plan, so as to optimize loading of the trucks 4 with a view to delivering the parcels in the predetermined sequence, and thus so as to facilitate the work of the handling employee.

Finally, the center 1 of the invention includes a service zone 15 at which the parcels 2 may, optionally, be weighed, labeled, or repaired. As described in detail below, the parcels 2 are conveyed to the service zone 15 by being carried by a rack 5 that is motor-driven by a shuttle cart 6. A security inspection of the parcels 2 may also be performed at the service zone 15.

The center 1 of the invention makes it possible to implement the method of handling parcels 2 that is described below, while optimizing the stowage in the stowage zone 11, and while optimizing the loading of the parcels 2 in the trucks 4 with a view to delivering them.

The handling method starts with the arrival of a parcel 2, e.g. brought by a truck 4 and unloaded at one of the unloading points 3. Arrival of the truck 4 can be detected automatically by any known means, or indicated by the handling employee, e.g. by means of a switch (not shown) provided for this purpose at the unloading point 3.

The central processing unit 7 then causes the docking step 100 to take place, in which an empty rack 5 stored in the stowage zone 11 is docked with a shuttle cart 6 that was previously stored under the racks 5 in the stowage zone 11, or in a distinct parking zone dedicated to the shuttle carts 6. For docking the rack 5, the central processing unit 7 causes the arms 62 to be deployed over a width corresponding to the format of the rack 5 to be docked. The format of the rack 5 to be docked may be decided in advance by the central processing unit 7 that then moves the shuttle cart 6 to one or other of the racks 5 identified as being of the format in question. In another operating mode, the shuttle cart 6 docks with a rack 5 more or less randomly, and, on docking, recognizes the format of that rack 5, and informs the central processing unit 7 in return. The rack 5 is identified and its format is known. The information concerning the format of the rack 5 is used subsequently by the central processing unit 7 for optimizing the stowage in the stowage zone 11. The rack 5 may also be identified and in particular its format may also be recognized subsequently upstream from the stowage zone 11.

Then, the central processing unit 7 causes the empty rack 5 to be moved 101 from the parking zone 13 to the unloading point 3. The handling employee may then take 102 a parcel 2 unloaded from the truck 4 and place it on the rack 5 that is motor-driven by the shuttle cart 6. Each parcel 2 is thus placed individually on a rack 5 that is motor-driven by a shuttle cart 6 controlled by the central processing unit 7. The presence of the parcel 2 on the rack 5 is detected automatically, e.g. by means of the variation in the load carried by the shuttle cart 6, or by a photoelectric cell (not shown) detecting the presence of any article on the tray 50 of the rack 5. The presence of the parcel 2 on the rack 5 may also be indicated by the handling employee, e.g. by means of a switch (not shown). The destination of the parcel 2, e.g. indicated on a label carried by the parcel 2, is read 103 and identified by any suitable read and optical character recognition (OCR) means. The rack 5 may also be identified during reading of the destination of the parcel 2. The information on the destination of the parcel 2 is transmitted to the central processing unit 7 that, through an associative table, an example of which is given below, associates 103 each destination of a parcel 2 with the identification of the rack 5 that carries it, or at least with its format.

ASSOCIATIVE TABLE

| | |
|---|---|
| Destination i | Rack i |
| . . . | . . . |
| Destination n | Rack n |

Thus, at any time, the central processing unit 7 knows where each parcel is and knows the format of the rack 5 that is carrying it.

The central processing unit 7 then allocates 104 a specific location of a segment 12 of the stowage zone 11 to the unloaded parcel 2, thereby defining an allocation table, an example of which is given below.

ALLOCATION TABLE

| | |
|---|---|
| Rack i | Location i (Stowage zone) |
| . . . | . . . |
| Rack n | Location n (Stowage zone) |

The specific location is allocated 104 by taking account of: the shipment into which the parcel 2 is to be included based on the outward shipping plan; the format of the rack 5 carrying the parcel 2 that is known via the associative table; and the filling of the stowage zone 11, i.e. how each specific location is occupied by racks 5 of particular formats. In optimum manner, each segment 12 corresponds to a shipment. Once the specific location has been allocated, the central processing unit 7 causes the shuttle cart 6 in question to be moved 105 to the specifically allocated location, at which the rack 5 is then uncoupled 106 from the shuttle cart 6, leaving the rack 5 and the parcel 2 it is carrying in place in the specific location. Depending on the prior occupation of the specific location, the newly stowed parcel 2 may find itself below and/or above another parcel 2, as shown in FIGS. 9 and 10. The nesting of the racks 5 and the superposition of the parcels 2 make it possible to optimize the stowage of the stowage zone 11. As shown diagrammatically in FIGS. 9 and 10, marking on the floor 16 for guiding the shuttle carts 6 may facilitate stowage of the racks 5 in the stowage zone 11.

Before the transfer 105 to the stowage zone 11, the central processing unit 7 may guide the shuttle cart 6 towards a service zone 15 in which the parcel 2 may, for example, be weighed, inspected, repaired, and provided with a label. Any other operation may be performed at the service zone 15, e.g. manually specifying the destination of a parcel 2 having a destination that is not clearly indicated.

After the uncoupling 106 between the shuttle cart 6 and the rack 5, the central processing unit 7 causes the shuttle cart 6 to return 107 empty, either to the parking zone 13 or to the unloading point 3 so as to take charge of another rack 5 carrying a parcel 2.

The unloading is continued until the truck 4 is empty, all of its load having been handled.

Once all of the parcels 2 have been unloaded, the parcels 2 can be loaded into the trucks 4 with a view to shipping them. The loading can be performed immediately afterwards or after a waiting time. For this purpose, the central processing unit 7 allocates a group of shuttle carts 6 to loading the parcels of each destination into one or more trucks 4 and organizes and determines 108 a loading sequence so that the trucks 4 are loaded in the delivery sequence of each shipment. Thus, during the shipment, the parcels 2 are accessible in the truck 4 as the shipment progress and in the order in which they are to be delivered, without requiring the handling employee to perform tedious operations for looking for parcels 2 or for moving parcels 2. Delivery of the parcels 2 is thus optimized, the workload of the handling employees is reduced and the risk of the parcels being damaged is limited.

The central processing unit 7 causes shuttle carts 6 to move 109 alone to each specific location in question of the stowage zone 11. The central processing unit 7 then causes each shuttle cart 6 to dock 110 with the corresponding rack 5 and causes the rack 5 carrying the parcel 2 to be transferred 111 from the stowage zone 11 to the loading point 3 at which the parcels 2 are loaded 112 one-by-one by the handling employee into the truck 4. After each parcel 2 has been loaded 112, the central processing unit 7 causes the rack 5 to be removed 113 by the shuttle cart 6 that transfers it to the parking zone 13 in which it is decoupled 114, pending subsequent use. The shuttle cart 6 may be placed on standby in the parking zone 13 or be used again immediately for unloading or loading another parcel 2, or for any other appropriate use. The parcels 2 continue to be loaded until the shipment is ready in the truck 4.

The handling method and the center 1 of the invention make it possible to achieve the above-mentioned objectives. They make it possible to facilitate the temporary storage of the parcels 2 before they are loaded, and to optimize loading of them in the delivery sequence to be followed, without requiring the handling employees to have in-depth knowledge of the shipment or of the delivery sequence itself. In addition, the handling method and the center 1 make it possible to manage simultaneously unloading the parcels 2 at a plurality of unloading points 3, and, likewise, simultaneously loading the parcels 2 into a plurality of trucks 4. The handling method and the center 1 of the invention further enable the use of the platform 10 to be reconfigured dynamically as a function of the volume of each shipment. Thus, the segments 12 are dedicated to the various shipments depending on their capacities and on the volume of each shipment. The handling method and the center 1 of the invention also offer the advantage of not requiring a fixed conveyor, but rather of using freely guided traveling.

Naturally, the present invention is in no way limited to the above description of one of its implementations, which can undergo modifications without going beyond the ambit of the invention.

The invention claimed is:

1. A method of handling parcels (2) in a logistics center (1) for handling parcels (2), the method comprising the steps consisting in unloading the parcels (2) at an unloading point (3) of the center (1), in moving said parcels (2) and in stowing them in organized manner in various segments (12) of a stowage zone (11) of said center (1), each segment corresponding to a shipment of the parcels (2), and then in transferring said parcels (2) waiting for loading from each segment (12) to a loading point (3), said method being characterized in that, in order to move and in order to stow said parcels (2), it further consists in using racks (5) of the nesting type on legs and of different formats (heights and widths), suitable for nesting together by being superposed on one another, and in using independent self-propelled motor-driven shuttle carts (6) suitable for docking (100) with each rack (5), which shuttle carts are controlled individually and remotely to travel in freely guided manner, and in that it further comprises the steps consisting in:

unloading (102) each parcel (2) onto a rack (5) of known format that is docked with and that is motor-driven by a shuttle cart (6);

identifying (103) the destination of each parcel (2);

using an outward shipping plan associating each destination of a parcel (2) with a shipment so as to allocate (104) a specific location of a segment (12) to said rack (5) carrying said parcel (2), taking account of the format of said rack (5) so as to enable said parcels (2) to be superposed, and causing said shuttle cart (6) to move (105) towards said specific location so as to store said parcels (2) side-by-side and in superposed manner; and using an inward delivery plan specifying the delivery sequence for said parcels (2) within the same shipment so as to cause a shuttle cart (6) to dock (110) with each rack (5) carrying a parcel (2) and so as to cause said parcel (2) to be transferred (111) from said stowage zone (11) to said loading point (3).

2. The handling method according to claim 1, wherein racks (5) are used that each have a tray (50) adapted to carry a single parcel (2), and a frame adapted to allow a shuttle cart (6) to fit under said tray (50) with it being possible for said shuttle cart (6) to dock with said frame on command, said frame being adapted to allow a rack (5) of different height and width to fit under or over said tray (50) and to enable said parcels (2) to be superposed.

3. The handling method according to claim 1, wherein racks (5) are used that each have a unique identifier, in that an associative table is established (103) between each unique identifier of a rack (5) and the destination of said parcel (2) that it is carrying so as to enable each parcel (2) to be located in said center (1) on the basis of said unique identifiers of the racks (5), and in that an allocation table is established (104) between each unique identifier of a rack (5) and said specific location that is allocated.

4. The handling method according to claim 1 wherein before moving said shuttle cart (6) to said stowage zone (11), said shuttle cart (6) loaded with a parcel (2) is caused to move from said unloading point (3) to a service zone (15) of said center (1), in which zone at least one operation is performed that is chosen from the group comprising at least affixing a label to said parcel (2), weighing said parcel (2), inspecting said parcel (2), repairing said parcel (2), performing a security inspection on said parcel (2).

5. The handling method according to claim 1, wherein as many racks (5) are used as there are parcels (2) to be sorted.

6. The handling method according to claim 1, wherein a digital image is taken of each parcel and, on the basis of said digital image, said destination of said parcel is recognized.

7. A logistics center (1) for handling parcels (2), the logistics center comprising at least one unloading/loading point (3) for unloading/loading said parcels (2) and a stowage zone (11) that is designed to receive parcels (2) waiting for loading and that is subdivided into various segments (12), each of which corresponds to a shipment of the parcels (2), said logistics center being characterized in that it includes racks (5) of the nesting type on legs and of different formats (heights and widths), suitable for nesting together by being superposed on one another, and independent self-propelled motor-driven shuttle carts (6) suitable for docking (100) with each rack (5), identification means (14) for identifying the destination of each parcel (2), a monitoring and control central processing unit (7) that is suitable for individually and remotely controlling said shuttle carts (6) so that they travel in freely guided manner, and that has an outward shipping plan for shipment of said parcels (2), which plan associates each destination of a parcel (2) with a shipment, and an inward delivery plan specifying the delivery sequence for delivery of said parcels (2) within the same shipment, and in that said parcels (2) are stored side-by-side and in superposed manner in each segment (12).

8. The logistics center (1) according to claim 7, wherein each rack (5) has a tray (50) adapted to carry a single parcel (2), and a frame adapted to allow a shuttle cart (6) to fit under said tray (50) with it being possible for said shuttle cart (6) to dock with said frame on command from said central processing unit (7), said frame being adapted to allow a rack (5) of different height and width to fit under or over said tray (50) and to enable said parcels (2) to be superposed.

* * * * *